United States Patent [19]

Grotz

[11] 4,146,197

[45] Mar. 27, 1979

[54] BOUNDARY LAYER SCOOP FOR THE ENHANCEMENT OF COANDA EFFECT FLOW DEFLECTION OVER A WING/FLAP SURFACE

[75] Inventor: Charles A. Grotz, Seattle, Wash.

[73] Assignee: The United States of America as represented by the Secretary of the Air Force, Washington, D.C.

[21] Appl. No.: 833,788

[22] Filed: Sep. 16, 1977

[51] Int. Cl.² ............................................. B64C 21/02
[52] U.S. Cl. ................................. 244/12.5; 244/204; 244/207
[58] Field of Search ..................... 244/204, 12.1, 198, 244/12.5, 207, 212, 213, 215

[56] References Cited

U.S. PATENT DOCUMENTS

| 3,827,657 | 8/1974 | Schwarzler | 244/215 |
| 3,884,433 | 5/1975 | Alexander | 244/207 |
| 3,940,092 | 2/1976 | Farris | 244/207 |

FOREIGN PATENT DOCUMENTS 488614  7/1938  United Kingdom ..................... 244/204

Primary Examiner—Galen L. Barefoot
Attorney, Agent, or Firm—Joseph E. Rusz; James S. Shannon

[57] ABSTRACT

A STOL aircraft having turbojet or torbofan engines mounted above and forward of the wing whereby the engine exhaust gases flow over and, by the Coanda effect, attach to the upper surfaces of the wing and a downwardly curved extendible flap to produce a downwardly turned exhaust flow having a large vertical component of thrust. Premature separation of the exhaust flow from the wing or flap due to reduced velocity in the boundary layer of the flow, which would result in decreased turning of the exhaust gases and a reduced vertical thrust component, is prevented by a boundary layer scoop extending across the exhaust flow, in an area just prior to where the exhaust flow would separate from the wing or flap, for removing the boundary layer gases and discharging them beneath the wing.

2 Claims, 3 Drawing Figures

BOUNDARY LAYER SCOOP FOR THE ENHANCEMENT OF COANDA EFFECT FLOW DEFLECTION OVER A WING/FLAP SURFACE

RIGHTS OF THE GOVERNMENT

The invention described herein may be manufactured and used by or for the Government of the United States for all governmental purposes without the payment of any royalty.

BACKGROUND OF THE INVENTION

This invention relates to STOL (short takeoff and landing) aircraft and particularly those employing the Coanda effect to rotate the direction of the jet engine thrust and thereby obtain some vertical lift force directly. The jet engines in such STOL aircraft are mounted above and forward of the wing whereby the jet exhaust gases flow over the upper wing and flap surfaces and are rotated thereby.

The characteristics of boundary layers and the Coanda effect are both well known in the art. Various techniques for control of the boundary layer to improve the aerodynamic flow over a wing airfoil have likewise been devised, examples being U.S. Pat. Nos. 2,646,945 and 2,650,781.

The application of the Coanda effect to rotate the direction of the jet exhaust flow and thereby supplement lift is a more contemporary approach. In the typical application, the jet engine is mounted above and forward of the wing with the exhaust directed to flow over the upper wing and flap surfaces. The rearward edge of the wing normally contains a retractable flap assembly. When extended for takeoff and landing the upper surface of the flap's rearward edge is in a near vertical plane. The Coanda effect causes attachment of the jet exhaust first to the upper wing surface and then onto the upper flap surface. The jet exhaust is thereby rotated to produce a vertical component of thrust, without the implementation of any external deflection means.

The fundamental weakness in the application of the Coanda effect to rotate the thrust of the jet exhaust through any significant angle has been the nature of the boundary layer flow to lose velocity, with respect to the wing surface, and precipitate premature separation of the exhaust flow, i.e. before it reaches a near vertical direction. Furthermore, this detrimental characteristic is more prevalent as the air speed or angle of attack increases.

BRIEF SUMMARY OF THE INVENTION

The purpose of the invention is to prevent the premature separation of the jet exhaust flow from the upper wing and flap surfaces. This is accomplished by removing the low velocity boundary layer, at a location prior to flow separation, using an aerodynamic scoop extending across the exhaust flow. The flow collected by the scoop is discharged beneath the wing.

The removal of the low velocity boundary layer enhances Coanda effect attachment of the jet exhaust to the extended upper flap surface as it curves downward to a near vertical direction. This removal technique not only produces a vertical thrust component but also retains that vertical component over a wider range of air speed and angle of attack than otherwise possible.

DETAILED DESCRIPTION OF THE INVENTION

Figure 1:
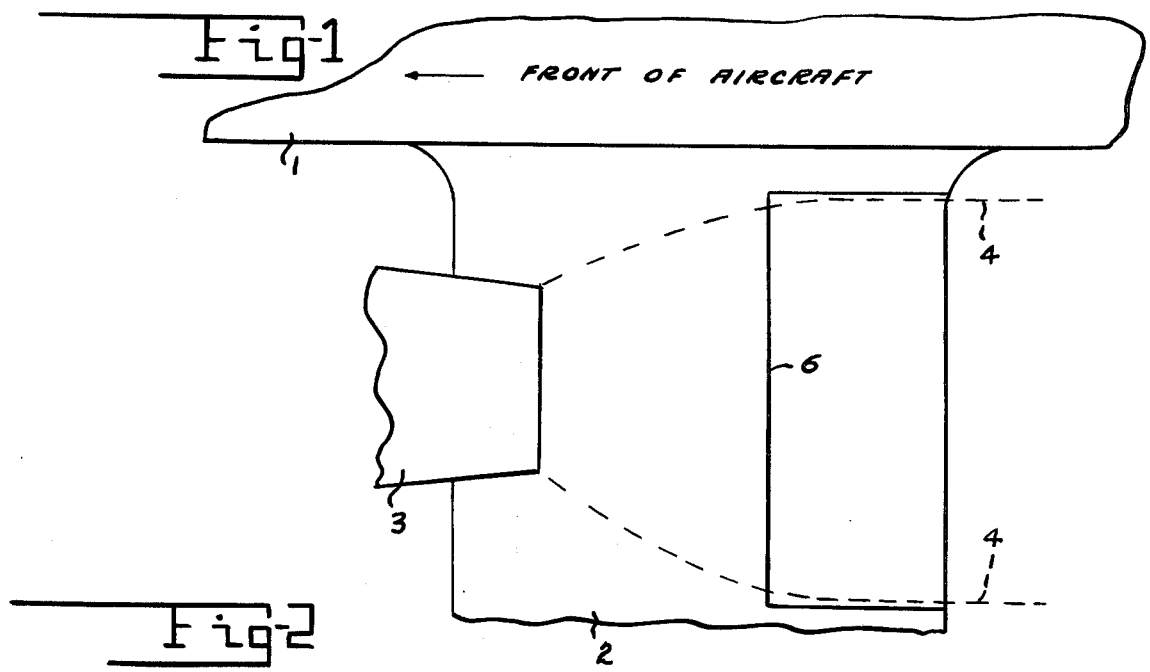
FIG. 1 is a schematic diagram looking downward on the wing in the region where the jet exhaust flows over the wing.
Figure 2:
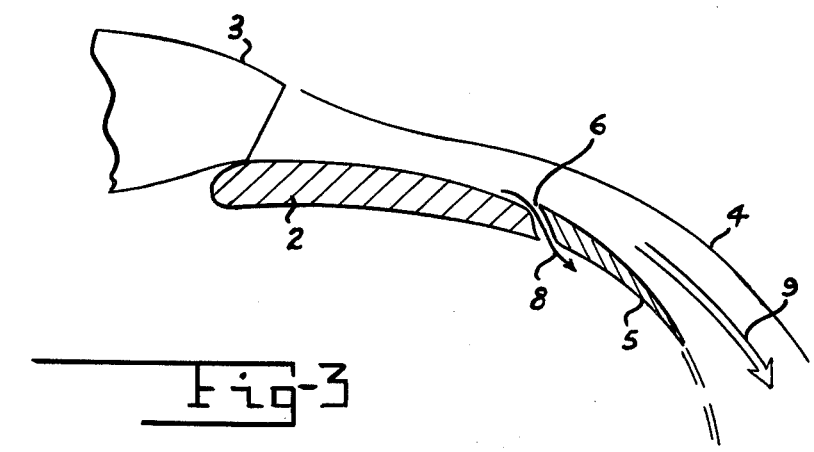
FIG. 2 is a schematic side view of the wing in FIG. 1, showing the scoop of the forward edge of the flap.
Figure 3:
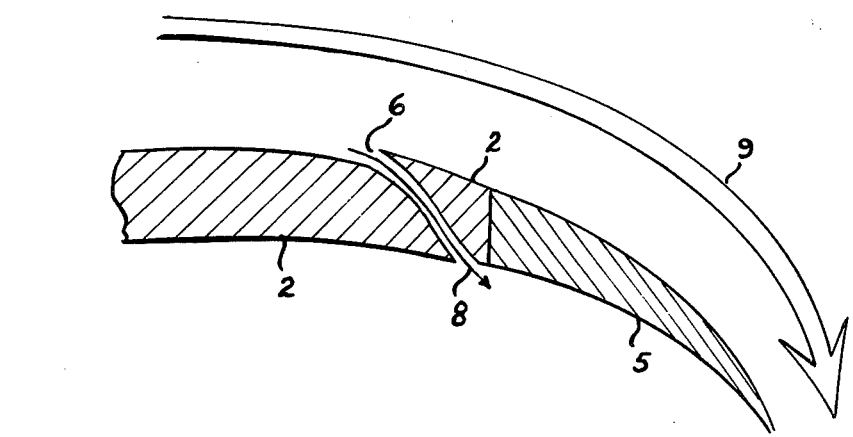
FIG. 3 is similar to FIG. 2, but having the scoop in the wing prior to the flap.

The invention is embodied in the aerodynamic scoop apparatus shown in FIGS. 1, 2 and 3. FIG. 1 displays the region of the aircraft where fuselage 1 and wing 2 meet, viewed from above. Extendible flap 5 is at the rear of wing 2. The aircraft's turbojet or turbofan engine 3 is mounted over the wing with the exhaust plume spreading over the upper wing and flap surfaces with pattern 4. Boundary layer removal scoop 6 is also shown in FIG. 1, extending above the upper wing surface to perform its function.

The direction of the jet exhaust thrust is controlled by the position of flap 5. In normal horizontal flight flap 5 is retracted to a position where it functions as part of the rearward portion of wing 2. On the other hand, during takeoff and landing, when a thrust contribution is needed to aid the limited lift of the wing, flap 5 is extended and rotated downward at its rearward edge. Thereby the jet exhaust which attaches to the flap is directed either horizontally, during normal flight, or near vertically during takeoff and landing.

FIG. 2 shows one embodiment of the invention with the flap extended for takeoff or landing operation. In this embodiment scoop 6 is designed to be part of the forward section of flap 5. Boundary layer gases 8 enter at scoop 6 and are discharged at the underside of wing 2. The main jet exhaust flow 9 maintains Coanda effect attachment to flap 5 and is rotated downward to a near vertical direction.

A slightly different embodiment of this invention is shown in FIG. 3. Again the aircraft is in a takeoff or landing mode with flap 5 extended. Shown here is scoop 6 located within the structure of wing 2. As in the above case, boundary layer gases 8 are removed from the upper surface of wing 2 and discharged at the underside of the wing structure, and the main jet exhaust flow remains attached to flap 5.

By the nature of the aerodynamic flows about wing 2 the pressure beneath the wing, where boundary layer gases 8 exit, is lower than the pressure at the inlet to scoop 6. With this pressure differential the scoop can remove the boundary layer without the supplemental use of any suction pump means.

Detail design parameters, such as scoop locations, sizes, and their relationship to the flaps, are amendable to experimental analysis and then only for the particular aircraft being considered.

I claim:

1. In a short takeoff and landing aircraft having a jet engine mounted above and forward of the wing so as to blow over the upper surface of the wing, and an extendible downwardly curved flap located at the rearward edge of the wing behind said engine which, when extended, effectively forms a downwardly curved extension of said upper surface, whereby the exhaust gases of the engine attach to the upper surfaces of the wing and extended flap due to the Coanda effect, resulting in a downward deflection of the engine exhaust gases and a large vertical component of thrust, means for preventing separation of the exhaust gases from said surfaces due to decreased velocity in the boundary layer of the exhaust gas flow, said means comprising a scoop located ahead of said flap and transversely of the gas flow and extending above the upper surface of the wing by an amount not exceeding the thickness of the boundary layer, said scoop communicating with the bottom surface of the wing and acting to remove the boundary layer gases alone and discharge them beneath the wing.

2. Apparatus as claimed in claim 1 in which said scoop communicating with the bottom surface of the wing is formed by the forward edge of the flap and a gap between the forward edge of the flap and the wing when the flap is extended.

* * * * *